United States Patent [19]
Schotten

[11] 4,314,666
[45] Feb. 9, 1982

[54] ADJUSTABLE ELECTRONIC TEMPERATURE CONTROL, ESPECIALLY FOR REFRIGERATORS OR THE LIKE

[75] Inventor: Henno Schotten, Giengen, Fed. Rep. of Germany

[73] Assignee: Bosch-Siemens Hausgeräte GmbH, Munich, Fed. Rep. of Germany

[21] Appl. No.: 79,185

[22] Filed: Sep. 26, 1979

[30] Foreign Application Priority Data

Sep. 26, 1978 [DE] Fed. Rep. of Germany ....... 2841783

[51] Int. Cl.³ ..................... G05D 15/00; G05D 23/00
[52] U.S. Cl. .................................. 236/78 R; 236/94; 62/126; 338/201
[58] Field of Search ............... 62/126, 129, 130, 125; 236/78, 94; 165/26; 338/201; 323/75 H

[56] References Cited

U.S. PATENT DOCUMENTS

| | | | |
|---|---|---|---|
| 3,434,041 | 3/1969 | Nordahl et al. | 338/201 |
| 3,616,846 | 11/1971 | Wills | 165/26 |
| 3,918,636 | 11/1975 | Dawson | 236/78 |
| 3,942,718 | 3/1976 | Palmieri | 165/26 X |
| 4,169,357 | 10/1979 | Kelley | 62/126 |
| 4,187,093 | 2/1980 | Boratgis et al. | 62/126 X |

FOREIGN PATENT DOCUMENTS 628492 10/1961 Canada ........................... 323/75 H Primary Examiner—William E. Wayner
Assistant Examiner—Harry Tanner
Attorney, Agent, or Firm—Herbert L. Lerner; Laurence A. Greenberg

[57] ABSTRACT

Adjustable electronic temperature control, having a bridge circuit with arms and at least one diagonal connected between points of the bridge, a thermistor for sensing temperature connected in one of the arms, a control circuit to be activated by the temperature control, a circuit for activating an indicating and safety device, at least two amplifiers for switching the control circuit and indicating and safety circuit on and off, means connected in the at least one diagonal for supplying a control voltage to the amplifiers, a plurality of resistors connectible in parallel in another arm for setting a setpoint temperature in the temperature control, the resistors having values increasing in a binary code, and at least one coding switch for selectively connecting the resistors in parallel in accordance with given temperature steps.

13 Claims, 4 Drawing Figures

ADJUSTABLE ELECTRONIC TEMPERATURE CONTROL, ESPECIALLY FOR REFRIGERATORS OR THE LIKE

The invention relates to an adjustable electronic temperature control, especially for refrigerators or the like, including a thermistor which serves as a temperature sensor and is connected into an arm of a bridge circuit, the bridge diagonal of which supplies a control voltage for at least two electronic amplifiers which switch, on the one hand, a control circuit and on the other hand, an indicating or safety device, while a variable control resistor is connected into the other arm for adjusting the set-point.

German Published, Non-Prosecuted Application No. 26 43 658 shows a temperature control of the hereinafore mentioned type. In that device, the electronic bridge circuit equipped with the thermistor as a temperature sensor includes four voltage dividers. The first and the second voltage dividers form a first diagonal voltage bridge for controlling the temperature control unit, and the third and fourth voltage dividers form a diagonal voltage bridge for controlling the safety unit. Meanwhile, the second and fourth voltage divider form a measuring bridge to which an indicating instrument for the temperature is connected. The setting of the control and response range, respectively, (which is analog in this case) of the heretofore known temperature control is accomplished by means of variable control resistors in the form of potentiometers which are disposed in the first and third voltage divider and can be adjusted together.

Because of the four different voltage dividers required for this purpose, the circuit of the heretofore known temperature control is expensive and complicated.

It is accordingly an object of the invention to provide an adjustable electronic temperature control especially for refrigerators or the like, which overcomes the hereinafore-mentioned disadvantages of the heretofore known devices of this general type, and to develop it so that the setpoint temperature can be set at the temperature control digitally.

With the foregoing and other objects in view there is provided, in accordance with the invention, an adjustable electronic temperature control especially for refrigerators or the like, comprising a bridge circuit having arms and at least one diagonal connected between points of the bridge, a thermistor for sensing temperature connected in one of the arms, a control circuit to be activated by the temperature control, a circuit for activating an indicating and safety device, at least two amplifiers for switching the control circuit and indicating and safety circuit on and off, means connected in the at least one diagonal for supplying a control voltage to the amplifiers, a plurality of resistors connectible in parallel in another arm for setting a setpoint temperature in the temperature control, the resistors having values increasing in a binary code, and at least one coding switch for selectively connecting the resistors in parallel in accordance with given temperature steps.

It is possible by means of the construction according to the invention to provide, in a simple manner, an adjustable electronic temperature control with digitally settable setpoint adjustment, without the need for expensive and complicated digital-to-analog converters.

In accordance with another feature of the invention, the coding switch is settable to individual degrees of temperature on the celsius scale.

This makes the digital setting of the setpoint particularly simple and clean-cut.

In accordance with a further feature of the invention, there is provided an actuating device for controlling the coding switch, the actuating device having symbols disposed thereon for indicating the setpoint temperature set in the coding switch.

In accordance with an added feature of the invention, there is provided another resistor having two ends connected in the one arm, and wherein the at least one diagonal includes two diagonals, one of the diagonals having an end connected between one end of the other resistor and the thermistor, and the other of the diagonals having an end connected to the other end of the other resistor, whereby the voltage in the diagonals is different or shifted.

This shift, which is obtained in a simple manner, allows the operational amplifier switching the indicating or the safety device to respond only when an extreme temperature deviation occurs at the thermistor, which is outside the normal control cycle, due to an extraordinary operating condition in the monitored space.

In accordance with an additional feature of the invention, one of the at least two amplifiers switches the indicating and safety circuit on and off, the one amplifier being connected in the other diagonal.

In accordance with yet another feature of the invention, the indicating and safety device includes means for indicating normal and disturbed operating conditions of the temperature control. The indicating means may be an acoustical device or an optical device such as a light-emitting diode (LED).

In accordance with yet a further feature of the invention, there are provided means connected in the control circuit for indicating a switched on and switched off condition in the control circuit. This may also be an LED.

In accordance with yet an added feature of the invention, there is provided a motor for a refrigerator compressor connected in the control circuit.

In accordance with yet an additional feature of the invention, there is provided a thyristor connected in the control circuit, the gate of the thyristor being connected to one of the amplifiers.

In accordance with a concomitant feature of the invention, at least one resistor is connected to each one of two coding switches.

Other features which are considered as characteristic for the invention are set forth in the appended claims.

Although the invention is illustrated and described herein as embodied in adjustable electronic temperature control, especially for refrigerators or the like, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
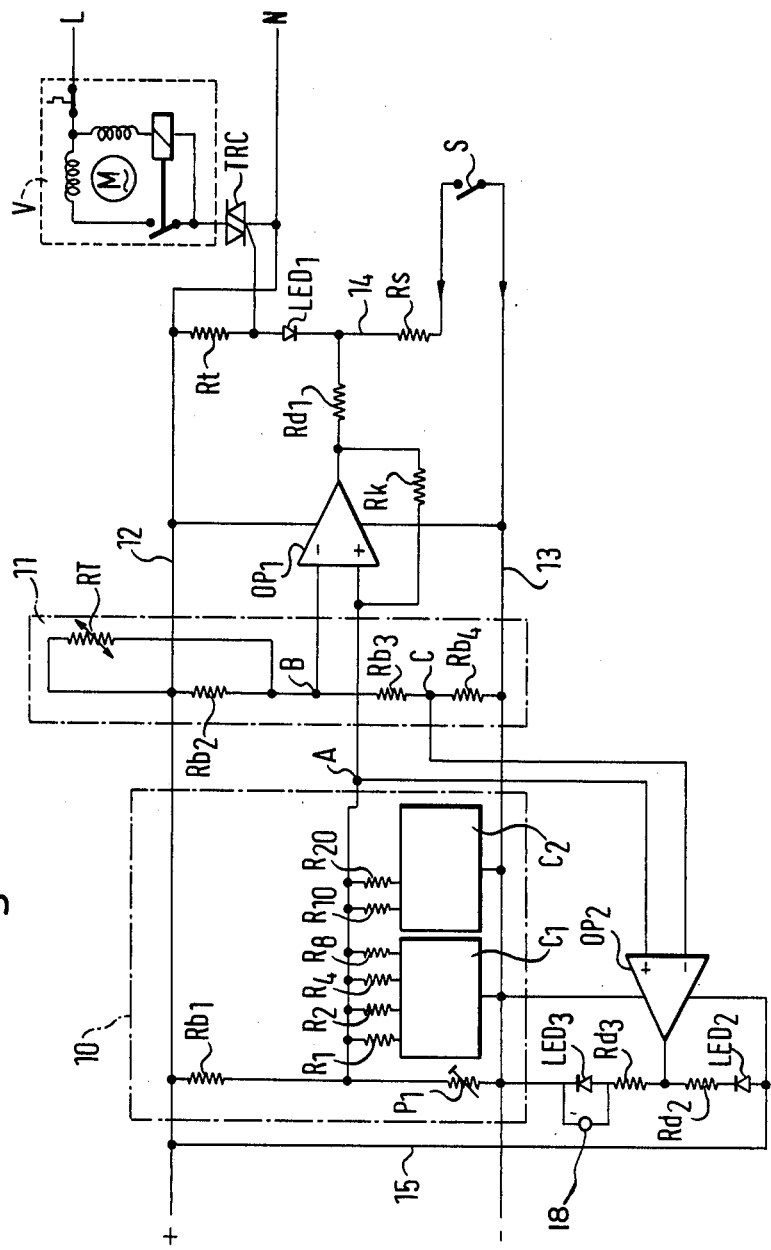
FIG. 1 is a circuit diagram of a temperature control equipped with a bridge circuit for digitally setting the setpoint temperature.

Referring to the figures of the drawing and first, particularly, to FIG. 1 thereof, there is seen an adjustable electronic temperature control shown in a simplified circuit diagram. The diagram comprises a first voltage divider 10, one branch of which contains a resistor $Rb_1$, while its other branch contains a potentiometer $P_1$, which is shunted by resistors $R_1$, $R_2$, $R_8$, as well as $R_{10}$ and $R_{20}$, of coding switches $C_1$ and $C_2$, respectively. In a second voltage divider 11, on the other hand, an NTC (negative temperature coefficient) resistor or thermistor RT serving as a temperature sensor and a resistor $Rb_2$ are connected in parallel into one branch, while resistors $Rb_3$ and $Rb_4$ are connected in series in the other branch. The two voltage dividers 10 and 11 are connected parallel to each other between lines 12 and 13, which lead to the positive and negative pole, respectively, of a d-c voltage source, not shown. They form a bridge circuit having bridge diagonals located between two reference points "A" and "B". The two inputs of an operational amplifier $OP_1$ are connected to the reference points "A" and "B". The output of the operational amplifier $OP_1$ is fed back to its non-inverting input through a resistor Rk. A resistor $Rd_1$ is also connected to the output of the operational amplifier $OP_1$ and is tied at the other end thereof to a line 14. This line 14 is connected between the two lines 12 and 13 which come from the positive and negative pole, respectively, of the d-c voltage source. The line 14 has two branches starting from the junction point of the resistor $Rd_1$. In the one branch of the line 14 leading to the negative line 13, a resistor Rs and a switch S are connected in series, while in the other branch, connected to the positive line 12, a resistor Rt is connected in series with a light-emitting diode $LED_1$. Between the resistor Rt and the light-emitting diode $LED_1$, the gate of a thyristor TRC is connected. The thyristor TRC controls the circuit of a working motor V for the compressor of a compression refrigeration machine of known construction in dependence on the thermistor RT which is connected into one branch of the voltage divider 11 and serves as the temperature sensor.

In a second bridge diagonal, which extends between the reference point "A" and a reference point "C" which is in turn located between the resistors $Rb_3$ and $Rb_4$ in a branch of the voltage divider 11, another operational amplifier $OP_2$ is disposed. This second bridge diagonal is "shifted" by the resistor $Rb_3$ relative to the first bridge diagonal extending between the reference points "A" and "B". The output of the other operational amplifier $OP_2$, which is located in this "shifted" second bridge diagonal, is connected by a line 15 through a resistor $Rd_2$ and a series-connected second light-emitting diode $LED_2$, to the line 12 which is connected to the positive pole. The output of the other operational amplifier $OP_2$ is also connected, through a resistor $Rd_3$ and a series-connected to third light-emitting diode $LED_3$, to line 13 which is connected to the negative pole.

Figure 2:
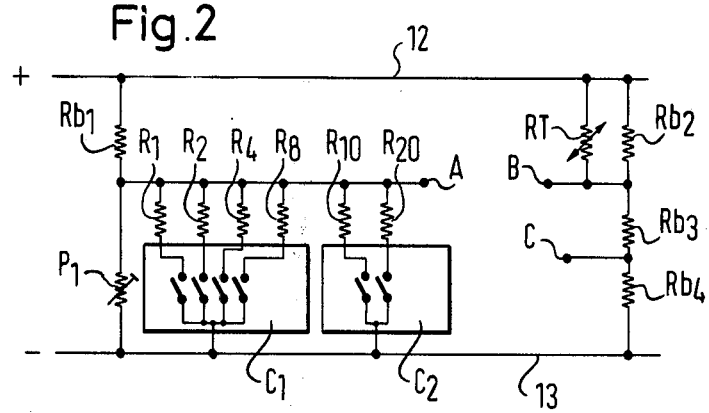
FIG. 2 is a diagram of a bridge circuit similar to that shown in FIG. 1 with the resistors connected into the arms thereof.
Figure 3:
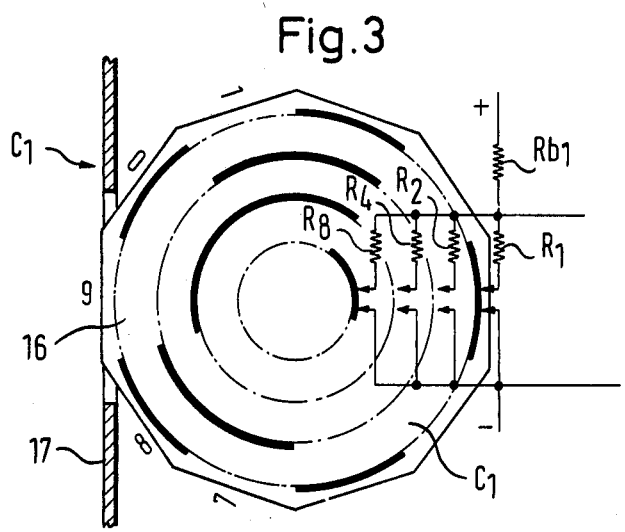
FIG. 3 is a diagrammatic view, including a schematic diagram, of an actuating device for the decimal "ones" digit of the coding switch in a simplified construction.

The construction of the coding switch $C_2$ can be seen in particular from FIGS. 2 and 3. A handle 16 for operating the coding switch $C_1$ which influences the decimal "ones" digits is diagrammatically shown in FIG. 3. Through the use of the handle 16, the resistors $R_1$, $R_2$, $R_4$ and $R_8$ which are conected in parallel to the potentiometer $P_1$ in the second bridge arm of the voltage divider 10, can be connected parallel in a coded manner. The conductance of these resistors is doubled, so that $R_2$ has twice, $R_4$ four times and $R_8$ eight times, the conductance of $R_1$. In the 10 positions of the coding switch $C_1$ which are possible between reference numerals 0 and 9 shown in FIG. 3, the total conductance of the device changes in accordance with the value of the binary code. The switching of the decimally set resistors is accomplished by means of the four switches diagrammatically shown in FIG. 3 in binary code according to the following Table:

| Position C 1 | Resistors cut-in | | | |
|---|---|---|---|---|
| 0 | 0 | 0 | 0 | 0 |
| 1 | 0 | 0 | 0 | $R_1$ |
| 2 | 0 | 0 | $R_2$ | 0 |
| 3 | 0 | 0 | $R_2$ | $R_1$ |
| 4 | 0 | $R_4$ | 0 | 0 |
| 5 | 0 | $R_4$ | 0 | $R_1$ |
| 6 | 0 | $R_4$ | $R_2$ | 0 |
| 7 | 0 | $R_4$ | $R_2$ | $R_1$ |
| 8 | $R_8$ | 0 | 0 | 0 |
| 9 | $R_8$ | 0 | 0 | $R_1$ |
| 0 | 0 | 0 | 0 | 0 |

The coding switch $C_2$ for resistors $R_{10}$ and $R_{20}$ is of similar construction. The conductances of these resistors, however, is ten-times larger than those of the coding switch $C_1$. Thus, the next-higher decimal digit of the temperature control can be set digitally.

In the temperature control, which is laid out in the present case for use in a refrigerator, there are only two resistors in the coding switch $C_2$, which limits the latter to the positions 0, 1 and 2.

Figure 4:
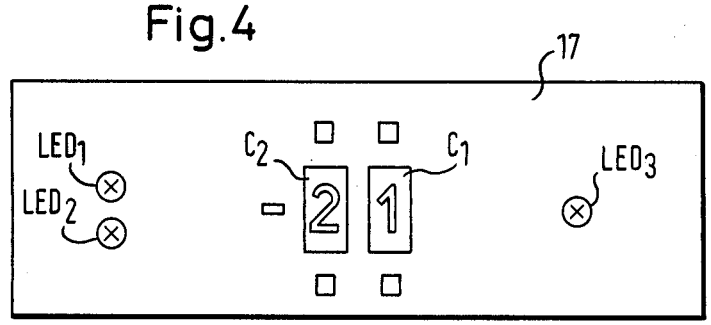
FIG. 4 is a diagrammatic view of a switchboard with a setpoint temperature display formed by the actuating devices of the coding switch, and several warning and indicating lamps.

The end faces of the handle 16 of the coding switch $C_1$, which has the outline of a regular decagon, are provided with numerals which are placed in numerical order from 0 to 9 and are visible in a window of a panel 17 (FIGS. 3 and 4) according to the position of the handle. In the panel 17 are provided, in addition to the adjacent window for the handle of the coding switch $C_2$, further windows which are associated with the individual light-emitting diodes $LED_1$ to $LED_3$.

The hereinafore described circuit allows the setpoint temperature of the refrigerator to be set digitally by means of the coding switches $C_1$ and $C_2$ while it can be read decimally in the windows of the panel 17. The bridge voltage between the reference points "A" and "B" which corresponds to the setpoint temperature, is evaluated in the temperature control by the operational amplifier $OP_1$. As long as the temperature monitored by the thermistor RT which serves as the temperature sensor, is too high in the storage space of the refrigerator, the resistance of the former is small. At the inverting input of amplifier $OP_1$, the potential is therefore more positive than at the non-inverting input. Thus, the output potential of the operational amplifier $OP_1$ is minus. The light-emitting diode $LED_1$ carries current and thyristor TRC is fired through the gate, so that the drive motor V of the compressor of the refrigerator is activated.

If the setpoint temperature, set by means of the two handles 16 of the coding switches, is reached, the resistance of thermistor RT is so high that the bridge is balanced. Through a feedback of the operational amplifier $OP_1$ through the resistor Rk, the former acts as a Schmitt trigger. Its output potential is flipped to plus. The light-emitting diode $LED_1$ and thyristor TRC are cut off and the drive motor V of the compressor is switched off. As the refrigeration space monitored by the thermistor RT gets warmer, the resistance of RT becomes smaller. Thereby, the circuit flips back again and switches the drive motor V of the compressor back on again, as described. The switching hysteresis can be chosen by the magnitude of thyristor RT.

In the circuit described herein, the drive motor V of the compressor of the refrigerator can also be switched-on independently of the temperature prevailing in the refrigeration space or set at the temperature control through the switch S inserted into the line 14. In this case as well, the light-emitting diode $LED_1$ remains in conduction and indicates operation of the drive motor V.

The light-emitting diodes $LED_3$ and $LED_2$ according to the circuit diagram described, serve as warning and automatic indicators, respectively. They are controlled by the second bridge circuit, which is "shifted" by the resistor $Rb_3$ relative to that which controls the power supply of the motor V. This, on the one hand, forces tracking of the temperature cycle. If the sensor RT is warmed up, however, the bridge circuit which is effective for the operational amplifier $OP_2$ is balanced by the voltage division at $Rb_3$ and $Rb_4$ somewhat later than for the operational amplifier $OP_1$. In normal operation, the warming up of the sensor RT is interrupted by the switching-on of the cooling through the operational amplifier $OP_1$. This results in lowering the temperature in the refrigeration space so quickly that the light-emitting diode $LED_3$ does not light up. Thus, the light-emitting diode $LED_2$ always remains switched on. The inverting input of the operational amplifier $OP_2$ is more positive than the non-inverting input only in case of a fault or an extreme temperature break in the space monitored by the thermistor. Then, the light-emitting diode $LED_2$ serving as an automatic lamp is extinguished and the light-emitting diode $LED_3$ serving as a warning lamp lights up and the buzzer 18 connected in parallel therewith sounds. The buzzer 18 may also be connected in series with $LED_3$ or it may replace it.

There are claimed:

1. Adjustable electronic temperature control, comprising a bridge circuit having arms and at least one diagonal connected between points of the bridge, a thermistor for sensing temperature connected in one of said arms, a control circuit to be activated by the temperature control, a circuit for activating an indicating and safety device, at least two amplifiers for switching said control circuit and indicating and safety circuit on and off, means connected in said at least one diagonal for supplying a control voltage to said amplifiers, a plurality of resistors connectible in parallel in another arm for setting a set-point temperature in the temperature control, said resistors having conductance values increasing in a binary code, and at least one coding switch for selectively connecting said resistors in parallel in accordance with given temperature steps, said coding switch including a handle being rotatable into a plurality of positions, a plurality of arcuate conductors being disposed along separate substantially concentric imaginary circles on said handle, and an open contact being connected to each of said resistors, being fixed relative to said handle and being closable by being placed in contact with one of said conductors, a given number of contacts being closed by said conductors in each of said positions of said handle.

2. Temperature control according to claim 1, wherein said coding switch is settable to individual degrees of temperature on the celsius scale.

3. Temperature control according to claim 1, including an actuating device for controlling said coding switch, said actuating device having symbols disposed thereon for indicating the setpoint temperature set in the coding switch.

4. Temperature control according to claim 1, including another resistor having two ends connected in said one arm, and wherein said at least one diagonal includes two diagonals, one of said diagonals having an end connected between one end of said other resistor and said thermistor, and said other of said diagonals having an end connected to the other end of said other resistor, whereby the voltage in said diagonals is different.

5. Temperature control according to claim 4, wherein one of said at least two amplifiers switches said indicating and safety circuit on and off, said one amplifier being connected in said other diagonal.

6. Temperature control according to claim 1, wherein said indicating and safety device includes means for indicating normal and disturbed operating conditions of the temperature control.

7. Temperature control according to claim 6, wherein said indicating means is an acoustic device.

8. Temperature control according to claim 6, wherein said indicating means is an optical device.

9. Temperature control according to claim 8, wherein said optical device is a light-emitting diode.

10. Temperature control according to claim 1, including means connected in said control circuit for indicating a switched on and switched off condition in said control circuit.

11. Temperature control according to claim 1, including a motor for a refrigerator compressor connected in said control circuit.

12. Temperature control according to claim 11, including a thyristor connected in said control circuit, the gate of said thyristor being connected to one of said amplifiers.

13. Temperature control according to claim 1, wherein at least one resistor is connected to each one of two coding switches.

* * * * *